Oct. 7, 1924.　　　　　　　　　　　　　　　　　　1,510,947
C. H. LIDDELL
ATTACHMENT FOR TILTING AND REVOLVING HEADLIGHTS
Filed Aug. 21, 1922
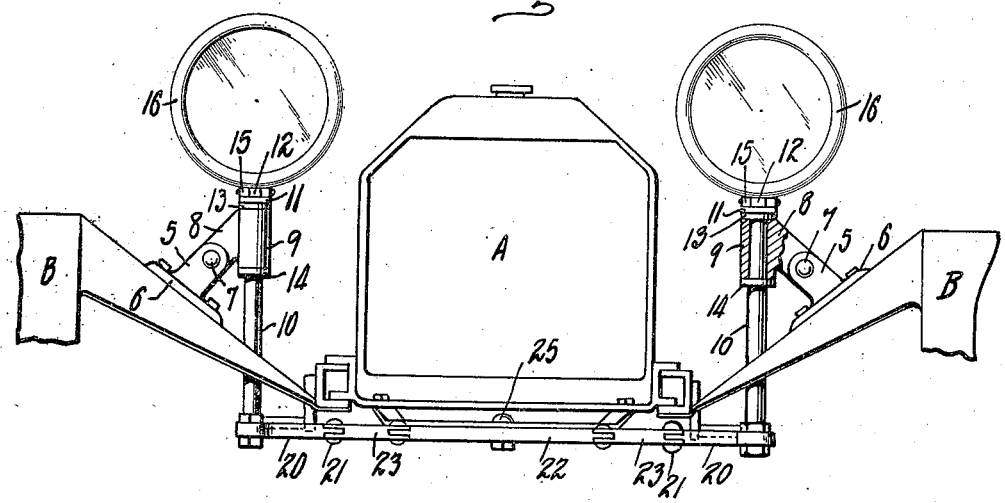
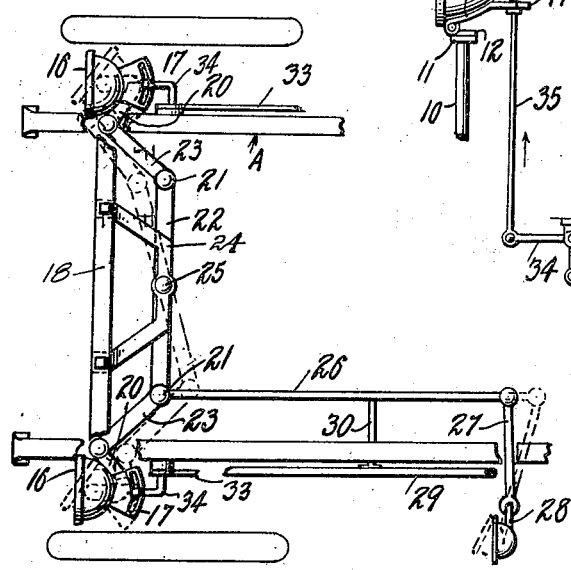
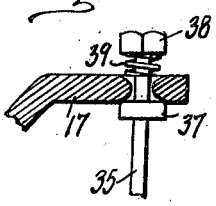
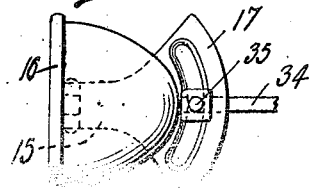
Inventor
Chas. H. Liddell Patented Oct. 7, 1924.

1,510,947

UNITED STATES PATENT OFFICE.

CHARLES HENRY LIDDELL, OF RAYMOND, WASHINGTON.

ATTACHMENT FOR TILTING AND REVOLVING HEADLIGHTS.

Application filed August 21, 1922. Serial No. 583,248.

*To all whom it may concern:*

Be it known that I, CHARLES HENRY LIDDELL, a citizen of the United States, residing at Raymond, in the county of Pacific and State of Washington, have invented certain new and useful Improvements in Attachments for Tilting and Revolving Headlights, of which the following is a specification.

This invention relates to certain new and useful improvements in automobile attachments and comprises a dirigible headlight, of simple construction and of few parts.

The primary object of my invention is to provide an automobile with a headlight so constructed that the light will readily turn in the direction the wheels are turned, thereby insuring the light being directed at all times in the direction the car is moving.

Another object is to provide headlights for automobiles so constructed that the same be readily tilted upward and downward.

With these and other objects in view, the present invention consists in the combination and arrangement of parts as will be hereinafter more fully described and finally pointed out in the appended claim, it being further understood that changes in the specific structure shown and described may be made within the scope of the claim without departing from the spirit of the invention.

In the accompanying drawings forming a part of this specification and in which like numerals of reference indicate similar parts in the several views:

Figure 1 shows a front view with parts broken away of an automobile frame showing my dirigible lights as secured thereto.

Figure 2 is a top view of the light actuating mechanism.

Figure 3 shows a side view in detail of one of the lights with parts broken away.

Figure 4 is a top view of the lever arrangement employed to tilt the lamps.

Figure 5 is a detail of the hinge and arm.

In the drawings A, indicates a part of the body of an automobile, and B the mud guards of the front wheel, to which is fixed the lower member 5, of the bracket as used in my invention, having the securing base 6, held in place by means of suitable bolts.

As shown this bracket 5, carries the pivot pin 7, on which is held the upper bracket member 8, this bracket member having the sleeve 9, in which is revolubly held the lamp shaft 10 which at its upper end carries the head 11, to which is fixed the lower hinge member 12, as shown in Figure 3. Working below the head 11, is the collar 13, arranged to ride on the sleeve 9, while held below the sleeve 9 and fixed to the shaft 10, is the collar 14, these collars preventing vertical displacement of the shaft 10. Fixed to the upper end of the shaft 10 is a hinge member 15, one leaf of which carries the lamp 16, the hinge member ending in the extending arm 17 shown in detail in Figure 3.

The lower end of the lamp shaft 10 carries the crank arm 20 which is pivotally connected by a link 23 and pin 21 to the end of the rock bar 22 pivotally mounted as by the stud or pin 25 on a support 24, rigidly secured to a portion 18 of the vehicle frame.

Extending from the pin 21 is the rod 26, connected at its rear end to the pivotally held lever 27, by means of which the spot light shaft 28 is rocked.

The rod 26 is shifted and actuated in being connected to the automobile reach rod 29 by means of which the automobile is steered and guided, through the medium of the arm 30.

In order to tilt the lamps I employ the foot crank 31 (see Fig. 3), pivotally mounted as at 32 to which crank is connected a rod 33 extending to the bell crank 34, while extending from the bell crank 34 is the upstanding rod 35, which is threaded at its upper end and extends through an arcuate opening in the outer end of the hinge arm 17. As shown in Figure 5, the rod 35 has the nuts 37 and 38 the upper nut 38, serving as a stop against which the spring 39 works. The sliding connection thus provided permits of the turning of the lamp about the axis of the shaft 10, in rounding corners, as will be readily understood.

In order to hold the foot crank 31, in proper position I employ the spring 40 having one end fixed to the horizontal extension of the foot crank 31, while the other end is fixed to the bottom of the car, this construction being fully shown in Figure 3.

In referring to Figure 2 it will be noticed that on shifting the reach rod 29 backward or forward the member 26 will be rocked resulting in the lamp shaft 10 being turned to direct the lamp in the desired direction.

It is understood that while I have described but one lamp two are used, the construction and operation being the same in both cases.

From the foregoing description, taken in connection with the accompanying drawings, the operation and advantages of my invention will be readily understood.

Having thus described my invention, what I claim, and desire to secure by Letters Patent, is:

In a dirigible headlight for vehicles the combination with the body of a vehicle of vertically disposed lamp shafts rotatably mounted on said body; means actuated by the steering gear of the vehicle for oscillating said shafts about their vertical axes; a hinge carried by the upper end of each of said shafts, one leaf of which is extended and provided with an arcuate opening; lamps secured to said leaves; a vertically movable actuating rod passing through said opening and having sliding engagement with said extension; and pedal operated means for moving said rod.

In testimony whereof I affix my signature.

CHARLES HENRY LIDDELL.